April 23, 1968    A. B. DI FRANCESCO    3,379,597
APPARATUS FOR SEVERING FILM AND TAPE FOR SECUREMENT
OF A PORTION OF THE TAPE TO THE FILM
Filed April 5, 1965
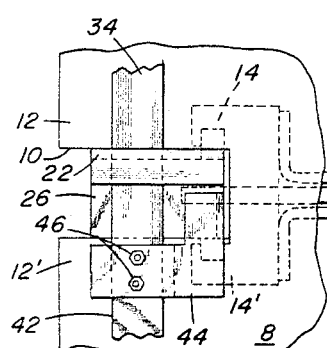
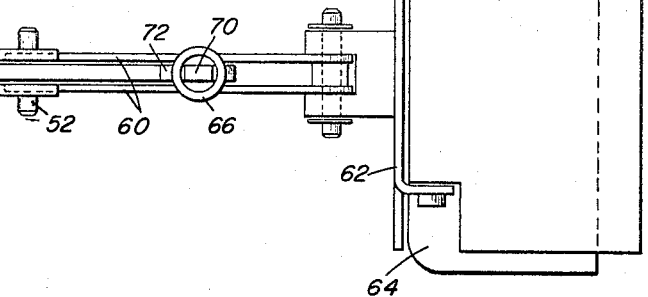
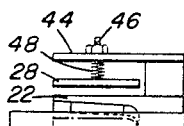
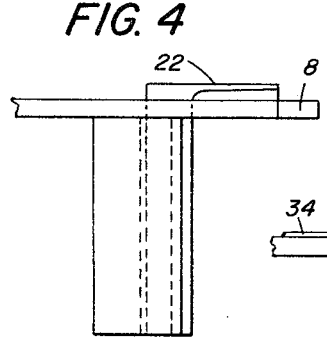
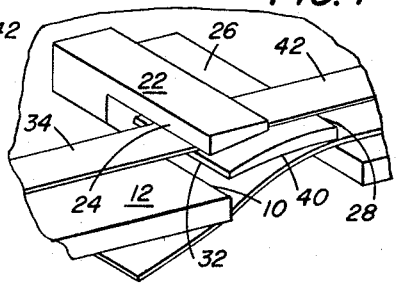
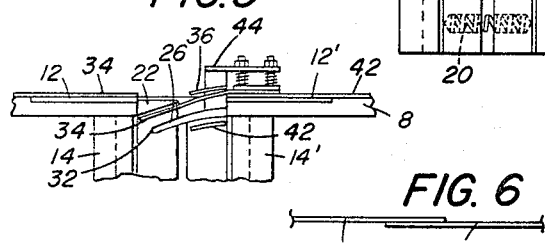
ALPHONSE B. DiFRANCESCO
INVENTOR.
BY R. Frank Smith
ATTORNEYS United States Patent Office 3,379,597
Patented Apr. 23, 1968

3,379,597
APPARATUS FOR SEVERING FILM AND TAPE FOR SECUREMENT OF A PORTION OF THE TAPE TO THE FILM
Alphonse B. Di Francesco, Penfield, N.Y., assignor to Eastman Kodak Company, Rochester, N.Y., a corporation of New Jersey
Filed Apr. 5, 1965, Ser. No. 445,591
10 Claims. (Cl. 156—506)

ABSTRACT OF THE DISCLOSURE

An apparatus is disclosed to aid the photofinisher in securing together a plurality of film strips for processing. In daylight operation, the apparatus severs the end of an exposed film extending from a cassette and a predetermined length of tape while the film and tape are disposed in spaced overlapping relation. The severed portion of the tape extends over the severed end of the film for securement thereto when the two are pressed together. The remaining portion of the tape is secured in the dark to the trailing end of the previously exposed, but unprocessed film strip on a master roll.

---

This invention relates generally to trimming and splicing, and more specifically to an apparatus for severing the end of a film and a predetermined length of tape with a portion thereof extending over the film for securement to the end of the film when pressed together.

In the photofinishing trade, the photofinisher normally removes a large number of exposed films from the casettes or other containers, and secures them together to form a large master roll for processing. In this way, the entire group of films may be processed at one time rather than running each film individually through the processing machine which is extremely time consuming and inefficient. Heretofore, the securement of the individually exposed films together into a master roll has been performed in the darkroom in order to prevent spoilage of the film by further exposure. Needless to say, such a splicing operation is extremely difficult to perform in a darkroom, and presents many problems. Applicant has overcome this problem by providing an apparatus and method for simultaneously severing the leading end of a film extending from a cassette for trimming same, severing a length of tape predetermined by the operator from a supply thereof, and securing the severed length of the tape to the trimmed film in partially overlapping relationship therewith. All of these operations are performed under daylight conditions. When the film cassettes are taken into the darkroom for processing, it is then only necessary for the photofinisher to secure the remaining portion of each tape which extends past the end of the film to the trailing end of the previous film on the master roll.

One of the objects of this invention is to provide an improved apparatus and method for substantially simultaneously trimming the end of a film and severing a predetermined length of tape with a portion thereof extending over the film for securement to the end of the film when pressed together.

Another object of the invention is to provide a double cutting-splicing mechanism that is of simple design and construction, thoroughly reliable and efficient in operation, and economical to manufacture.

Objects and advantages other than those set forth above will be apparent from the following description when read in connection the accompanying drawing, in which:

FIG. 1 is a side elevation view of a double cutter-splicing mechanism constructed in accordance with one embodiment of this invention;

FIG. 2 is a top plan view of the mechanism of FIG. 1 with most of the base plate omitted for purposes of clarity;

FIG. 3 is a front elevation view of a portion of the mechanism of FIG. 1;

FIG. 4 is a left side elevation view of the mechanism of FIG. 3;

FIG. 5 is a segmental view similar to FIG. 3 showing the mechanism in a position after it has completed its operation of severing the end of a film for trimming same, severing a predetermined length of tape, and pressing the tape into engagement with the trimmed end of the film;

FIG. 6 is a segmental side elevation view showing the tape spliced to the trimmed end of the film; and FIG. 7 is a segmental view in perspective showing the cutting blades in their normal inactive position.

Referring to the drawing, a preferred embodiment of the double cutter-splicing mechanism comprises a base plate 8 to which the mechanism is secured. The base plate 8 has a slot 10 therein as best seen in FIG. 2, and hard metal inserts are provided along slot 10 with the edges thereof forming stationary cutting blades 12, 12'. Below the edges of blades 12, 12' and rigidly secured to base plate 8 by any suitable means are notched ways 14, 14' for receiving complementary edges of reciprocally movable slide members 16, 18. The slide members 16, 18 have aligned holes for receiving the ends of expandable helical springs 20 for urging the edges of slide members 16, 18 into engagement with their respective ways 14, 14'. The upper end of slide member 16 has a transverse projection 22 substantially parallel to base plate 8 as best seen in FIGS. 3 and 4. Projection 22 has a blade edge 24 thereof that slidably cooperates with blade 12 to perform a cutting function in a known way. The slide member 18 also has a transverse projection 26, a blade edge 28 of which slidably cooperates with blade 12' to provide a cutting action. The opposite edge of projection 26 is in register with and extends below projection 22. The lower surface 30 of projection 22 is spaced from the upper surface 32 of projection 26, and is of the same general configuration to form a guideway through which the end of a tape 34 may be guided. In the normal inoperative position of the mechanism as best seen in FIG. 3, the lower surface 30 of projection 22 extends above the upper surface of base plate 8, and a portion of the upper surface 32 of projection 26 extends slightly below the surface of base plate 8. Consequently, any tape 34 fed along base plate 8 from the left as seen in FIG. 3, will be guided through the guideway and deflected underneath a platen 38 by a deflector plate 36 to be explained hereinafter. The deflector plate 36 is integral with slide member 18, and extends therefrom substantially parallel to and spaced from projection 32. The lower surface 40 of projection 26 is of an arcuate configuration, and one edge thereof extends above the upper surface of base plate 8 for guiding downwardly a film end 42 fed along the upper surface of base plate 8 from the right as seen in FIG. 3.

The upper end of slide member 18 has another transverse projection 44 for supporting platen 38. Platen 38 has a pair of studs 46 secured thereto which extend through suitable openings in projection 44 and are secured thereto by nuts or the like. Interposed between platen 38 and projection 44, and encircling each of the studs 46 is a helical spring 48 for urging platen 38 downwardly with respect to projection 44, and to permit relative movement therebetween.

Although platen 38 is shown as a part of slide member 18, it is obvious that platen 38 may be separate therefrom and actuatable by the same or different means.

The linkage mechanism for reciprocally moving slide members 16, 18 comprises a three-armed lever 50 pivoted on a stub shaft 52, and having the end of arm 54 connected to slide members 16, 18 by means of a pin 56. Arm 58 of lever 50 is connected by a link 60 to a pivotally mounted armature 62 of a solenoid 64 secured to base plate 8. A helical spring 66, having one end encircling a bolt 68 on base plate 8 and its opposite end encircling a lug 70 on lever arm 72, biases lever 50 in a clockwise direction (FIG. 1) for urging slide members 16, 18 into their normal inactive position as seen in FIG. 3. Actuation of solenoid 64 under the control of any suitable switch means moves lever 50 into its full line position as seen in FIG. 1 causing slide members 16, 18 to move downwardly with blade edges 24, 28 thereof cooperating with blades 12, 12' to sever any material interposed therebetween.

In the method of operation of this invention, with the mechanism in its normal inoperative or inactive position, the leading end of film 42 from a cassette, not shown, is fed along the upper surface of plate 8 from the right as seen in FIG. 3. The film is fed through the space between blade edge 28 and the end of blade 12' with the film 42 guided downwardly by the lower surface 40 of projection 32. The leading end of a roll, not shown, of tape 34 is threaded from the left as seen in FIG. 3 through the guideway between respective upper and lower surfaces 30, 32 of projections 22, 26 with a portion thereof extending past blade edge 28 and overlying the film 42. When solenoid 64 is energized, the action of respective blade edges 24, 28 and blades 12, 12' severs a predetermined length of tape 34, and the end of film 42 for trimming same. Also, substantially simultaneously platen 38 engages one end of the severed tape 34 and urges it into pressure engagement with the trimmed film 42. To enhance the splicing operation, platen 38 may be heated by any suitable heating means such as an imbedded resistance element, not shown, if desired. When solenoid 64 is de-energized, spring 66 returns slide members 16, 18 to their normal position, and film 42 with the tape portion 34 secured thereto at one end may be removed for further operation.

The invention has been described in detail with particular reference to a preferred embodiment thereof, but it will be understood that variations and modifications can be effected within the spirit and scope of the invention as described hereinabove and as defined in the appended claims.

I claim:

1. In a mechanism for severing the end of a film strip and a predetermined length of tape for securement to the end of the film strip, the combination comprising:

two spaced pairs of cutting blades, each pair including one blade which in its normal inoperative position is spaced from its associated blade and mounted for movement into operative cutting relationship therewith;

said two pairs of cutting blades in their normal inoperative positions providing means for supporting and guiding a film strip and tape with the free end portions of said film strip and tape in spaced relation in which the free end portion of said film strip extends between one pair of blades and generally toward said other pair, and the free end portion of said tape extends generally in the opposite direction between said other pair and above and beyond said one pair into a position overlying said film strip;

and means for actuating said movable blades for movement from their normal inoperative positions to sever said tape and film strip with the free end portion of said tape overlying the severed end of said film strip.

2. The invention according to claim 1 wherein said supporting means includes a plate mounted between said pairs of blades, so inclined that when both are in normal spaced relationship it will direct free end portions of tape and strip to respectively opposite sides of the openings between said pairs of blades.

3. In a mechanism for use in securing a length of tape to the end of a film strip, the combination comprising:

a pair of stationary cutting means spaced a predetermined distance;

a pair of movable cutting means for cooperation therewith, and movable together between a normal first position and a second position, said pair of movable cutting means in said first position forming a guideway for directing one end of a film strip fed between one pair of said stationary and movable cutting means downwardly and generally in one direction toward said other pair, and directing one end of a tape upwardly and generally in the opposite direction for movement between the other pair of said stationary and movable cutting means with one portion of said tape end overlying said film strip beyond said one pair, said pair of movable cutting means when moved to said second position cooperating with said pair of stationary cutting means to sever the end of said film strip for trimming same, and severing a predetermined length of said tape with one portion thereof overlying the trimmed end of said film for securement thereto, and the remaining portion of said tape length extending beyond the trimmed end of said film strip a distance equal to said predetermined distance; and means for moving said movable cutting means between said first and second positions.

4. The invention according to claim 3, and further including a way secured to each of said stationary cutting means, said pair of movable cutting means comprises a pair of cutting blades, each reciprocally movable along one of said ways, and resilient means interposed between said pair of movable cutting means for urging said blades into engagement with said ways and stationary cutting means.

5. The invention according to claim 4 wherein said moving means comprises a linkage connected to said cutting blades, a spring for urging said linkage and cutting blades into said first position, and a solenoid connected to said linkage and adapted, when actuated, to move said cutting blades against the bias of said spring to said second position.

6. The invention according to claim 3, and further including means for securing said overlying portion of said tape to said film.

7. The invention according to claim 6 wherein said securing means comprises a movable platen for pressing said overlying portion of said tape into intimate pressure engagement with said film.

8. The invention according to claim 7 wherein said movable platen is resiliently supported by one of said movable cutting means.

9. The invention according to claim 6 wherein said moving means and said securing means are operated substantially simultaneously.

10. The invention according to claim 1 and further including means for securing said overlying portion of said tape to said film.

References Cited

UNITED STATES PATENTS 2,627,212  2/1953  Connor et al. _____ 156—514
2,842,184  7/1958  Manchester _____ 156—506

DOUGLAS J. DRUMMOND, *Primary Examiner.*